United States Patent [19]

Goltsos

[11] 4,051,266

[45] Sept. 27, 1977

[54] PACKAGE FOR HEATING FOOD IN ELECTRICAL APPLIANCES

[75] Inventor: Costas E. Goltsos, Weston, Mass.

[73] Assignee: Teckton, Inc., Wellesley, Mass.

[21] Appl. No.: 637,700

[22] Filed: Dec. 4, 1975

Related U.S. Application Data

[62] Division of Ser. No. 417,907, Nov. 21, 1973, Pat. No. 3,941,044.

[51] Int. Cl.² ............................................. B65B 25/22
[52] U.S. Cl. ........................................ 426/120; 206/484; 206/526; 229/56; 426/107; 426/87
[58] Field of Search ............................ 426/410–412, 426/413–415, 120, 107, 113, 114, 119, 234, 241, 243, 108, 126, 127, 87; 229/56, 87 F; 219/10.55 D, 10.55 E; 206/461, 463, 471, 526, 216, 466, 219, 484

[56] References Cited

U.S. PATENT DOCUMENTS

| 2,527,919 | 10/1950 | Drangle | 426/120 |
| 2,714,070 | 7/1955 | Welch | 426/234 |
| 2,714,557 | 8/1955 | Mahaffy | 229/56 |
| 2,838,404 | 6/1958 | Cohen | 426/113 |
| 3,079,912 | 3/1963 | Griem | 426/114 |
| 3,102,034 | 8/1963 | Weinberg | 53/12 |
| 3,511,665 | 5/1970 | Simjian | 426/412 X |
| 3,667,452 | 6/1972 | Brebant | 229/3.5 MF |

FOREIGN PATENT DOCUMENTS

| 791,285 | 7/1968 | Canada | 219/10.55 E |
| 479,968 | 1/1952 | Canada | 426/114 |
| 784,503 | 10/1957 | United Kingdom | 206/471 |

*Primary Examiner*—Steven L. Weinstein
*Attorney, Agent, or Firm*—Wolf, Greenfield & Sacks

[57] ABSTRACT

A multicomponent food package for heating food in electrical appliances. The package is dimensioned so that the package may be properly aligned in the appliance.

2 Claims, 4 Drawing Figures

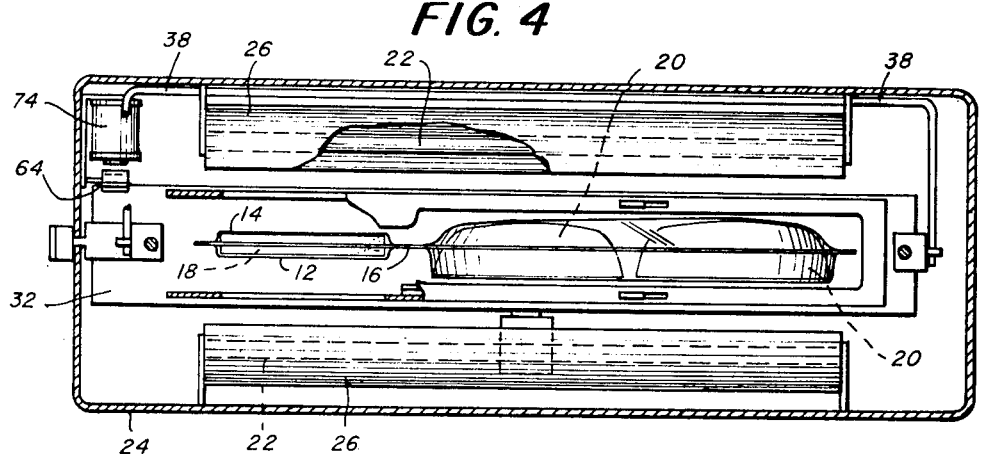

PACKAGE FOR HEATING FOOD IN ELECTRICAL APPLIANCES

This is a division of application Ser. No. 417,907, filed Nov. 21, 1973, now U.S. Pat. No. 3,941,044.

BACKGROUND OF THE INVENTION

This invention relates convenience foods, packages therefor, and a method and apparatus for preparing such foods. More particularly, it relates to the "toastable" type of convenience food which is heated in a toaster or toaster-like electrical applicance. The types of convenience foods prepared in this manner have been extremely limited and, for example, have included primarily foods such as waffles, french toast and pastries. This technique of convenience food preparation is limited still further in that the electrical appliances and manner in which the foods are packaged do not enable a number of different types of foods to be heated properly simultaneously. Thus, the toaster-type of convenience food has not been extended to foods such as hamburgers, sandwiches or other foods made from different food components which require different degrees of heating. It is among the primary objects of the invention to provide an electrical appliance and a convenience food package for use therewith which avoids the foregoing difficulties and which expands substantially the types of foods which may be prepared.

The invention permits a variety of precooked and frozen or refrigerated food products to be easily prepared. In this regard, such foods may be slightly undercooked before freezing so that when heated to the proper serving temperature, the added heat may complete the cooking process. Because the step of heating the prefrozen dinner both heats the food to serving temperature and also may partially cook the food, depending on the type of food, the application of the heat to the food will be referred to herein as "heat conditioning."

SUMMARY OF THE INVENTION

The food package includes a heat resistant plastic envelope transparent to infrared radiation or other suitable radiation employed in the heating appliance. The envelope may contain a plurality of component foods in separate, isolated compartments which may be defined by a heat sealed seam bonding opposite faces of the envelope. The electrical appliance may be of the "pop-up" toaster type and is provided with a carriage to receive the food package and to carry the food package into the appliance and into proper alignment with radiation heating elements mounted in the appliance on opposite sides of the carriage. The degree to which each of the component foods in the package is heated is controlled by shields carried by the carriage which embrace the opposite sides of the food package and which present a radiation opaque surface to the heating elements. Each of the shields is provided with one or more radiation transparent apertures which are in general alignment with the component food in the food package when the package is in the carriage. The relative size and configuration of the radiation transparent openings determine the degree of exposure of the foods to the radiation and, therefore, the extent to which the individual component foods are heated. The package configuration and the appliance include means cooperative to insure that the food package is properly placed in the carriage with its component foods properly oriented with respect to the radiation transparent apertures of the carriage. Supplemental means also may be included in the electricl appliance to vary the size of the radiation transparent windows should this be desired.

It is among the objects of the invention to provide an improved type of convenience food package and an electrical appliance therefor.

A further object of the invention is to provide a convenience food package and electrical appliance therefor which substantially expand the types of food which may be prepared.

A further object of the invention is to provide a convenience food package and an electrical appliance which enable a plurality of component foods to be heated simultaneously and in a manner which enables the degree of heating of the component foods to be individually controlled.

DESCRIPTION OF THE DRAWINGS

The foregoing and other objects and advantages of the invention will be understood more fully from the following further description thereof, with reference to the accompanying drawings wherein:

FIG. 4 is a plan view of the appliance, partly in section and partly broken away.

DESCRIPTION OF THE PREFERRED EMBODIMENT

Figure 1:
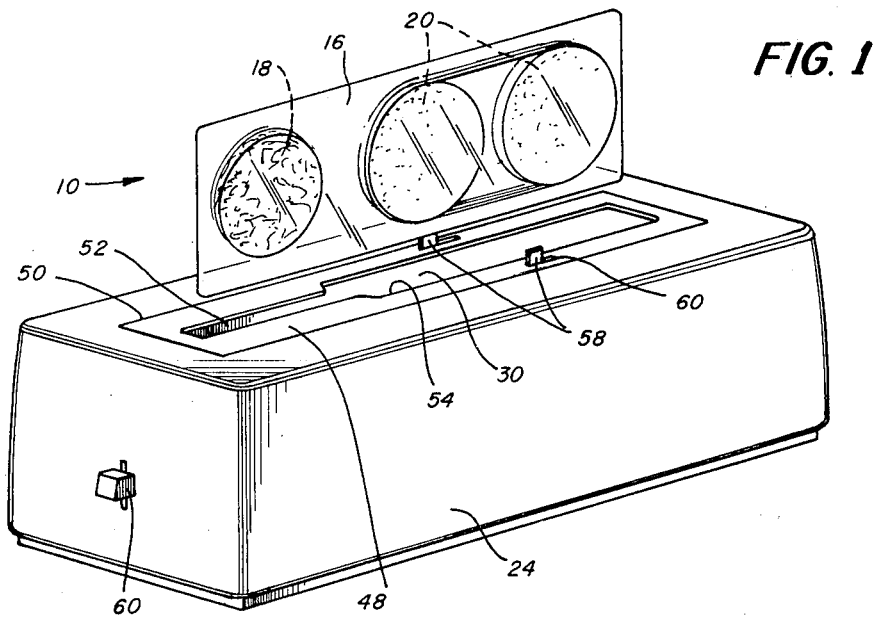
FIG. 1 is an illustration of the heating appliance with food package in alignment with the receptive opening in the appliance.

As shown in the drawings the food package, indicated generally by the reference character 10, is of generally flat, elongate configuration. The package is formed to define a sealed envelope and is made from an appropriate sheet plastic which is transparent to the radiation employed by the electrical appliance for heating and is capable of withstanding temperatures at which the appliance operates. In the preferred embodiment the radiation is infrared and a polyester base plastic can be employed for the envelope. The opposite faces 12, 14 of the envelope may be heat sealed about their peripheries and also to define a seam 16 which separates the envelope into a plurality of compartments. In the illustrative embodiment, there are two such compartments, one containing, for example, a hamburger patty 18 and the other compartment containing the two halves of a hamburger roll 20.

Figure 2:
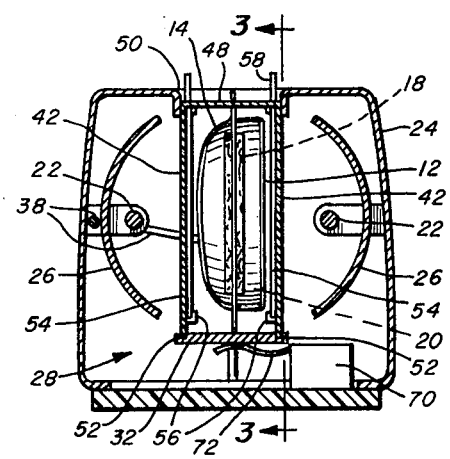
FIG. 2 is a sectional side elevation of the appliance with the food package disposed therein.
Figure 3:
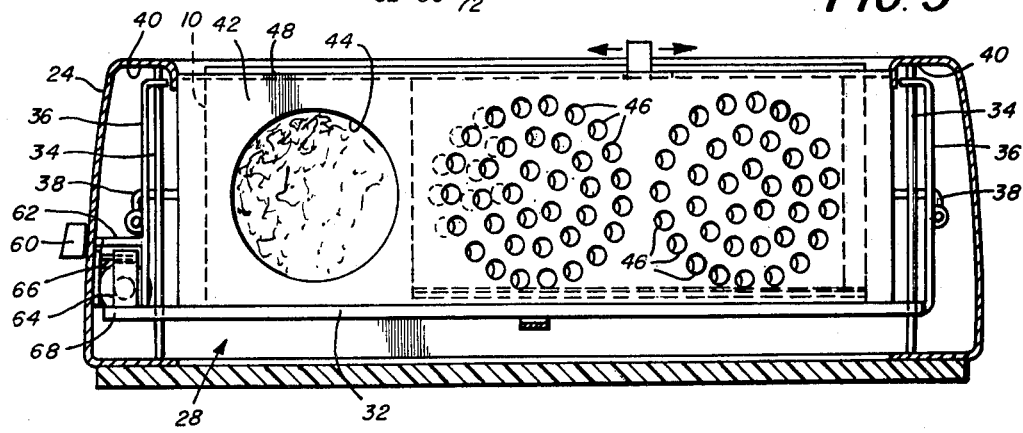
FIG. 3 is a longitudinal section of the appliance as seen along the line 3—3 of FIG. 2.

The electrical appliance for heat conditioning foods in the package resembles somewhat in outside appearance a "pop-up" toaster. Radiation heating elements such as quartz tubes 22 for emitting infrared radiation are supported within the housing 24 of the appliance and extend generally parallel to each other and longitudinally of the appliance. Reflectors 26 preferably are supported within the housing 24 to reflect the infrared radiation toward the center of a housing. The appliance includes a vertically movable carriage 28 located between the infrared heating element 22 and movable between an upper, package-receiving position and a lower, heating position shown in FIGS. 2 and 3. A slot 30 is provided to enable the food package 10 to be inserted into the open, upper, receptive end of the carriage 28.

The carriage includes an elongate bottom member 32 which is supported at its ends, for vertical movement toward and away from the top of the appliance. The bottom member 32 is guided in its movement by a pair of vertical rods 34 supported within the housing 24 at opposite ends thereof. The rods 34 are received in holes formed at the opposite ends of the bottom member 32. A bracket 36 is secured to each end of the bottom member 32 and has a hole formed in its upper end thereof which slidably engages the upper end of its associated vertical rod 34 to rigidify and guide the bottom member 32 in its vertical movement. The bottom member 32 and its integral brackets 36 are biased upwardly by a torsion spring 38 secured with the housing and having free ends connected to the brackets 36. The extent of upward movement of the carriage may be limited by engagement of the upper end of the brackets 36 with the upper interior surface 40 of the housing.

The carriage 28 includes and supports a pair of generally parallel, spaced side-walls 42 which serve to shield the food package 10 from the infrared radiation. Each of the shielding side-walls 42 preferably has a polished surface facing its respective infrared element 22 and reflector 26. Each of the shielding side-walls 42 includes one or more regions defining radiation transparent windows or apertures 44 formed to permit the infrared radiation to be directed through the radiation transparent envelope 10 and to the food to be heated. The degree of heating of each of the food components can be controlled by suitable selection of the configuration and size of the radiation transparent apertures. In the illustrative embodiment in which the convenience component foods comprise a hamburger patty 18 in one compartment and the halves of a hamburger roll 20 in the other compartment, the radiation transparent aperture 44, in the shielding side-wall which is aligned with the properly placed compartment carrying the hamburger patty, defines an area substantially larger than the plurality of smaller radiation transparent windows 46 formed in the shielding side-walls 42 and in alignment with the package compartment carrying the halves of the hamburger roll 20. In the illustrative embodiment, the hamburger patty 18 is exposed fully to the infrared radiation whereas the halves of the hamburger roll 20 are exposed only to a portion of the radiation. In the case of the halves of the hamburger roll, the multiplicity of apertures may define an area which is of the order of seventy per cent of that area defined by the surface of each half of the roll.

The portion of the carriage 28 defining the side-walls 42 may be constructed in a variety of ways. One such structure is shown in the illustrative embodiment and includes an inverted U-shaped member including the walls 42 and an intermediate connecting member 48. The U-shaped assembly 42, 48, 42 is received for vertical sliding movement through an elongate slot 50 formed in the upper surface of the housing 24. The intermediate portion 48 of the U-shaped member is formed to define the slot 30 which receives the food package 10. The lower edge on each of the sidewalls 42 may be received in longitudinal slots 52 formed in the bottom member 32. In this illustrative embodiment, the walls 42 move vertically in unison with the bottom carriage member 32. The food package 10 is designed so that when inserted through the slot 30 and into the carriage 28 is will rest in a position in proper alignment with the radiation transparent apertures in the walls 42.

Means also are provided to insure that the food package 10 is properly inserted into the appliance so that its component foods will be properly aligned with the corresponding radiation transparent apertures. This may be accomplished in any number of ways and in the illustrative embodiment the package is dimensioned asymmetrically as seen from its longitudinal edge with the hamburger patty 18 compartment being thinner than the compartment containing the halves of the hamburger roll 20. The slot 30 which receives the food package 10 similarly is of varying width having a narrow end 52 and a wider end 54 which will only permit insertion of the food package 10 into the appliance in the proper attitude in relation to the shielding walls of the carriage.

While the aperture configuration of any given pair of shielding walls may be sufficient to control the heating of a variety of different types of packaged foods, it may be desirable to enable the shields to be changed to other aperture configurations for use with other food package configurations having different component food combinations. The foregoing carriage construction lends itself to different package configurations which may have different thickness food components which may also require different relative degrees of heating. The inverted U-shaped member 42, 48, 42 may be withdrawn outwardly through the opening 50 and replaced by a different U-shaped member having a different array of apertures more suited for the particular food components.

The carriage is arranged in the appliance so that when in its lowered, operative position, its apertured regions are in central alignment with the radiant tubes 22. Similarly, the food package 10 is arranged so that its apertured regions are in central alignment with the radiant tubes 22. Similarly, the food package 10 is arranged so that its component foods are aligned centrally along the longitudinal axis of the food package so that when inserted into the appliance the component food, apertures and radiant tubes will be properly oriented and in alignment with respect to each other for even heat distribution.

A further aspect of the invention relates to a supplemental shielding arrangement which can be controlled by the user to further control the extent to which the component foods are heated. To this end a movable shielding plate 54 may be mounted adjacent each carriage wall 42. Each of the shielding plates may be provided with an identical array of apertures as in at least one of the apertured regions of the shielding walls 42. Each of the shielding plates 54 is movable, parallel to its associated shielding wall 42 so that the apertures 46' in the shielding plates are shown, in the drawings, as being associated only with the apertures 46 for controlling the heating of the hamburger roll, a similar configuration could be employed in conjunction with the apertures 44 which are associated with the hamburger patty. By selectively positioning the handles 58, the total effective area of the apertures 46 can be selectively controlled. In this regard it may be noted that some types of component foods may have special heating requirements in which one surface of the component food requires more heat than another side. For example, an "english muffin" half tends to absorb more heat at its rough, cut surface than at its hardened crust surface which absorbs heat at a lesser rate. By controlling the size and configuration of the apertures on the opposite sides of the carriage the heating requirements for such food components may be controlled carefully. Cheeseburgers also may fall into this category of component food where the cheese slice side requires less heat than the opposite side of the meat patty.

In use, the food package 10 is inserted into the upwardly exposed carriage through the slot 30. With the food package 10 properly inserted, the carriage then is moved downwardly as, for example, by depressing a handle 60, which may be secured to the bracket 36 by a member 62. The carriage may be locked in place in its lowered position by any number of means, such as by the freely depending U-shaped swing latch 64. The latch 64 is freely and pivotally suspended at its bight by the pivot pin 66 which is secured to the housing 24. One of the legs of the latch 64 cam simply swing over an extending end 68 of the bottom carriage member 32 when the member 32 has been advanced downwardly beyond the lower end of that leg of the swing latch member 64. Downward movement of the carriage to its heating position, shown in FIGS. 2 and 3, also actuates the heating elements 22 by means of a switch 70 which is controlled by movement of element 72 in response to engagement of the bottom member 32 in the carriage. The switch 70 and thermostatic element 72 also are constructed so that after a predetermined time and/or after the interior of the electrical appliance has reached a predetermined temperature, the switch 70 is operated to control a solenoid 74 (see FIG. 4) which attracts the other leg of the latch 64 to swing the latch member out of engagement with the member 32 thus releasing the carriage and enabling it to return to its upper position under the influence of the torsion spring 38. The food package then can be removed as its upper edge is exposed slightly through the slot 30. It should be noted, however, that the foregoing description of the control for operation of the appliance is intended merely as an illustration of one type of control. Numerous other types of latching and release controls commonly found in conventional toasters may be employed.

The electrical appliance also may be used as a conventional toaster. In this event it may be desirable to remove the U-shaped member 42, 48, 42 and replace it with a U-shaped member which is substantially free of any significant shielding, such as a thin wire grid arrangement.

While the invention has been described as being employed primarily with a radiant heat type of heating element, it also may be modified for use in special instances to include microwave heating elements. In this event, the apertures 46 in the shielding walls 42 should be formed so that the apertures in these walls are in alignment with each other. By aligning the apertures in the facing shielding walls 42, reflection of stray microwave energy between the walls 42 is minimized which provides for more effective control over the extent of heat conditioning.

Thus, I have described my improved convenience food package and electrical appliance for use therewith by which the types of "convenience" foods preparable in pop-types of heating appliances can be expanded and varied greatly. It should be understood, however, that the foregoing description of the invention is intended merely to be illustrative thereof and that other modifications and embodiments may be apparent to those skilled in the art without departing from its spirit.

Having thus described the invention what I desire to claim and secure by Letters Patent is:

1. A food package comprising:

a sealed envelope formed from plastic sheet material transparent to radiation of a character which is adapted to heat condition foods and capable of withstanding temperatures produced by such heat conditioning, said envelope being formed to define at least two distinct sealed compartments;

a multi-component food product comprised of different food components with a component disposed in each compartment wherein; at least two of said food components each require different degrees of heating in order to heat-condition said food product for serving; said food components being adapted for serving as a unitary food product;

said envelope being of a generally elongate configuration and having said compartments formed therein in longitudinally spaced side-by-side relation, at least one of said compartments being of a thickness which is less than that of the other compartment in said package, said compartments being arranged in the package as to be disposed asymmetrically with respect to a transverse center line of said envelope which is orthogonal to the longitudinal center line of said envelope, and said compartments disposed in central registry with the longitudinal center line of said envelope and symmetrical about a cross-sectional plane extending through the longitudinal center line of the envelope.

2. A food package as defined in claim 1 wherein said material is optically transparent.

* * * * *